US006997558B2

(12) United States Patent
Perlin et al.

(10) Patent No.: US 6,997,558 B2
(45) Date of Patent: Feb. 14, 2006

(54) VOLUMETRIC DISPLAY WITH DUST AS THE PARTICIPATING MEDIUM

(75) Inventors: Kenneth Perlin, New York, NY (US); Jefferson Y. Han, Holliswood, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 10/729,538

(22) Filed: Dec. 5, 2003

(65) Prior Publication Data

US 2004/0218148 A1 Nov. 4, 2004

Related U.S. Application Data

(60) Provisional application No. 60/432,452, filed on Dec. 11, 2002.

(51) Int. Cl.
*G03B 21/00* (2006.01)
*G06T 15/00* (2006.01)
(52) U.S. Cl. .......................................... 353/7; 345/419
(58) Field of Classification Search .................. 353/7, 353/10; 345/419
See application file for complete search history.

(56) References Cited

U.S. PATENT DOCUMENTS

| 5,270,752 A | * | 12/1993 | Kataoka et al. ............... 353/28 |
| 6,100,862 A | * | 8/2000 | Sullivan ....................... 345/88 |
| 6,466,184 B1 | * | 10/2002 | Whitesell et al. .............. 345/6 |
| 6,765,566 B1 | * | 7/2004 | Tsao .............................. 353/7 |
| 6,819,487 B1 | * | 11/2004 | Palovuori et al. ........... 359/443 |
| 2004/0227694 A1 | * | 11/2004 | Sun et al. ...................... 345/6 |

* cited by examiner

*Primary Examiner*—Christopher Mahoney
(74) *Attorney, Agent, or Firm*—Ansel M. Schwartz

(57) ABSTRACT

An apparatus for producing a volumetric display includes a scanning collimated light source that creates an image by illuminating a suspension of light-scattering particles in an optically transparent medium with a collimated beam, where the brightness of the collimated beam is modulated at each moment in time by an amount that is dependent upon the momentary direction of the beam and also on the distance of the scattering particle encountered by the beam at that moment. A method for producing a volumetric display. An apparatus for producing a volumetric display includes a light source for providing light. The apparatus includes a mechanism for producing a volumetric image with the light from the light source. The method includes the steps of producing light from a light source. There is the step of producing a volumetric image with the light from the light source.

30 Claims, 5 Drawing Sheets ium No. 60/432,452, filed Dec. 11, 2002.

VOLUMETRIC DISPLAY WITH DUST AS THE PARTICIPATING MEDIUM

This application claims the benefit of Provisional Application No. 60/432,452, filed Dec. 11, 2002.

FIELD OF THE INVENTION

The present invention is related to a volumetric display with dust as the participating medium. More specifically, the present invention is related to a volumetric display with dust as the participating medium that uses a scanning collimated light source that creates an image by illuminating the dust in an optically transparent medium.

BACKGROUND OF THE INVENTION

Currently, there is no form of display that allows objects to be imaged "in thin air." There are various forms of stereoscopic or holographic display which allow an observer's two eyes to perceive two different images, as long as the observer is looking into a display screen.

There are also swept-screen volumetric displays, in which rapidly successive images are projected upon a physically rotating screen which repeatedly sweeps through a volume. In this case a volumetric image composed of points of light is directly formed in space, visible by multiple observers. The entire device needs to be enclosed in a transparent dome, for safety. Alternatively, some volumetric display devices employ two laser beams of different frequencies, focused into a cubic volume that is filled with a photo-responsive material. At any given moment, the material visibly glows at that point within the cube where the two laser beam foci meet. By optically scanning the two beams through this material, a volumetric image can be formed within the cube.

But the display described in FIGS. 9 and 10 is the first which enables the sort of scenario popularized by such films as "Forbidden Planet" and "Star Wars." In the display devices posited in those movies, an animated figure is imaged directly in the air between them, with no need for a projection screen.

Such a display, for example, allows two or more people to hold a conversation, while discussing an animated figure or other object of interest that can be floating directly in the air between them. Observers can freely pass their hands through the display volume.

SUMMARY OF THE INVENTION

The present invention pertains to an apparatus for producing a volumetric display. The apparatus comprises a scanning collimated light source that creates an image by illuminating a suspension of light-scattering particles in an optically transparent medium with a collimated beam, where the brightness of the collimated beam is modulated at each moment in time by an amount that is dependent upon the momentary direction of the beam and also on the distance of the scattering particle encountered by the beam at that moment.

The present invention pertains to an apparatus for producing a volumetric display. The apparatus comprises a light source for providing light. The apparatus comprises means for producing a volumetric image with the light from the light source.

The present invention pertains to a method for producing a volumetric display. The method comprises the steps of producing light from a light source. There is the step of producing a volumetric image with the light from the light source.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
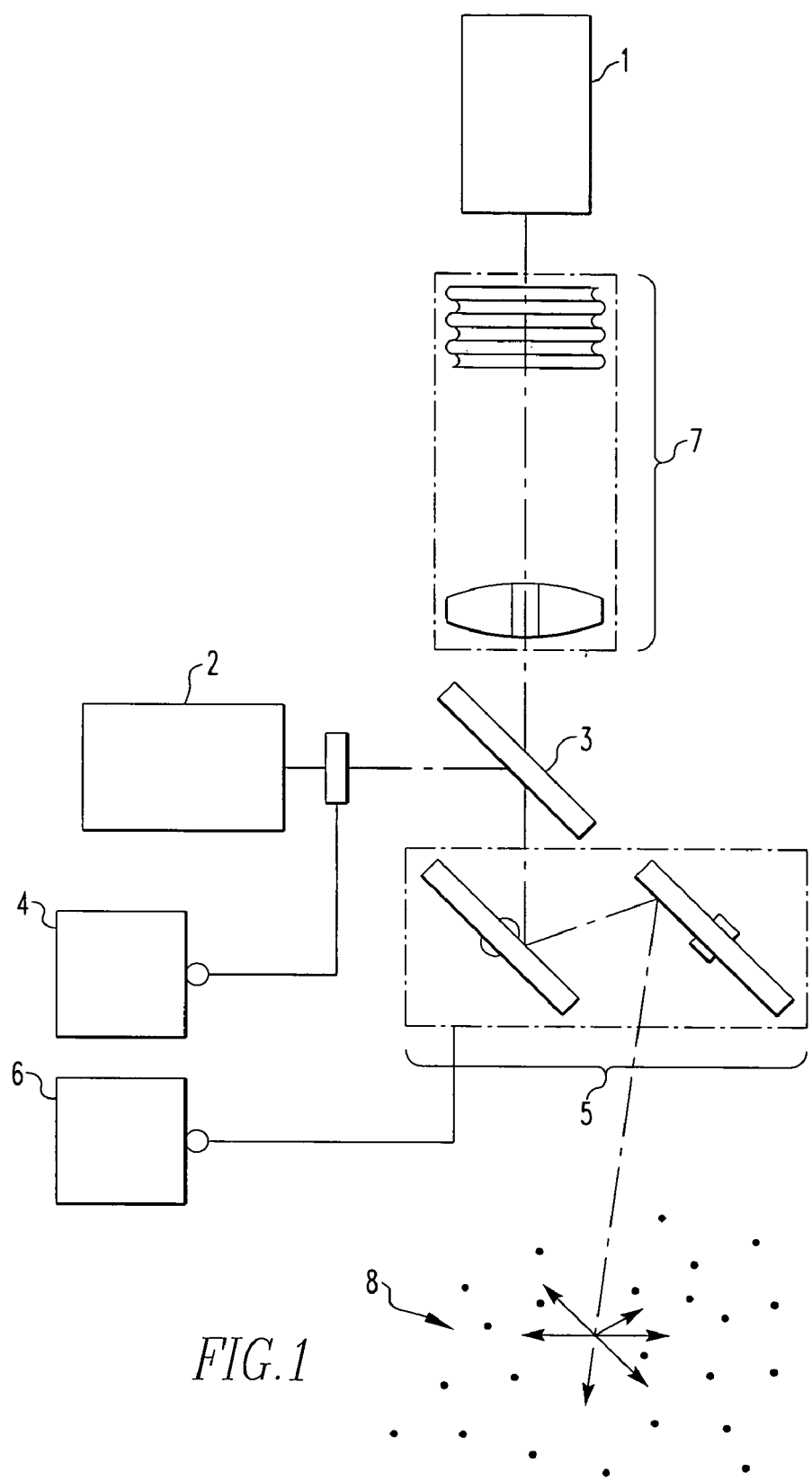
FIG. 1 is a schematic representation of an apparatus of the present invention.
Figure 7:
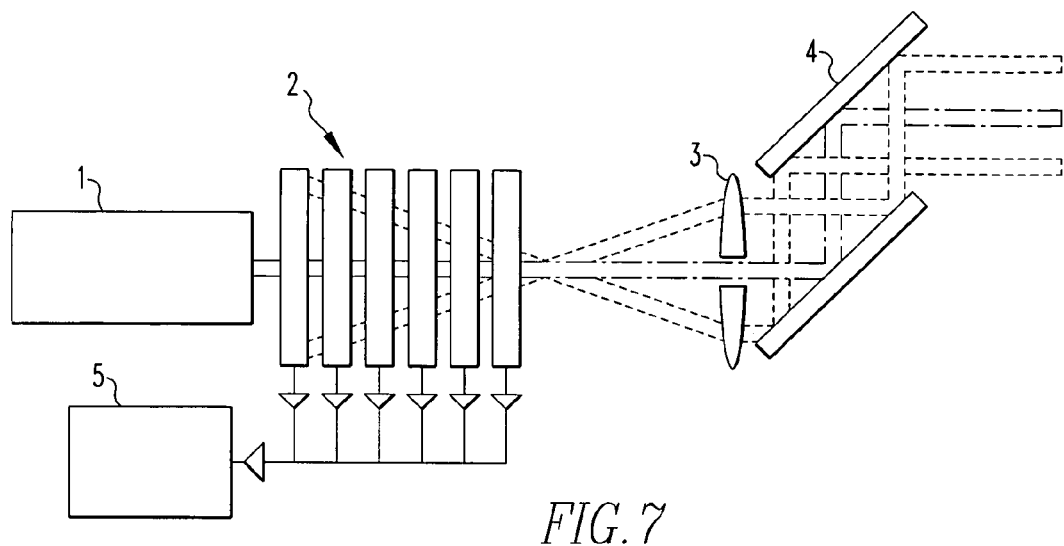
FIG. 7 is a schematic representation of a beam traveling through the apparatus.

Referring now to the drawings wherein like reference numerals refer to similar or identical parts throughout the several views, and more specifically to FIGS. 1 and 7 thereof, there is shown an apparatus 100 for producing a volumetric display. The apparatus 100 comprises a scanning collimated light source that creates an image by illuminating a suspension of light-scattering particles 8 in an optically transparent medium with a collimated beam, where the brightness of the collimated beam is modulated at each moment in time by an amount that is dependent upon the momentary direction of the beam and also on the distance of the scattering particle encountered by the beam at that moment.

Preferably, the collimated light source is a laser. The optically transparent medium is preferably air. Preferably, the light-scattering medium is suspended dust. The light source preferably includes rotating mirrors 5 or resonantly vibrating mirrors 5, which effect the scanning or some combination of rotating mirrors 5 or vibrating mirrors 5. Preferably, the scanning by the light source is two-dimensional, thereby sweeping out a volumetric display region.

The beam preferably includes a first, monitoring, collimating beam used to detect the presence of the particle, and a second, illuminating, beam is used to illuminate the detected particle.

Preferably, the monitoring beam is outside of the visible spectrum. The spectrum preferably is an infrared portion of the electromagnetic spectrum. Preferably, the illuminating beam may vary in color.

The light source preferably includes a red, green and blue laser 2 that produce three independently modulated contributions for color. Preferably, the contributions from the red, green and blue laser 2 are combined into a single beam path. The apparatus 100 preferably includes a dichroic beam combiner 3, which combines the contributions. Preferably, the apparatus 100 includes a computer having a memory in which a three-dimensional volumetric model of illuminance is stored, and in which the direction of the beam and the distance of the particle along the beam are used to index into this volumetric model to determine a brightness setting for the illuminating beam. The apparatus 100 preferably includes an optical detector 7 used to measure the light from the monitoring beam which a particle has scattered.

Preferably, the optical detector 7 measures the distance of the detected particle along the monitoring beam. The optical detector 7 is preferably collinear with the optical beam, so that returning light which is scattered directly back along the beam path is visible to the detector 7. Preferably, the returning light is focused by a focusing means wherein the focusing means includes a convex lens 13, and measurement of the distance between the focusing device and the point of focus of the returning light is used to determine the distance along the beam of the detected particle. The light source preferably produces scanning beams that are used to simultaneously illuminate two or more suspended particles 8 within the same volume.

The present invention pertains to an apparatus 100 for producing a volumetric display. The apparatus 100 comprises a light source for providing light. The apparatus 100 comprises means for producing a volumetric image with the light from the light source.

The light source preferably includes an infrared laser 1. Preferably, the light source includes an infrared switchable visible-light laser 2. The producing means preferably includes an optical component 3 for merging the beams of the two lasers. Preferably, the producing means includes computer 4 control for switching the visible-light laser 2.

The producing means preferably includes a time-varying optical beam steering mechanism 5. Preferably, the producing means includes computer 6 control for the time-varying optical beam steering.

The producing means preferably includes linear infrared-sensitive optical position sensor 7. Preferably, the producing means includes suspended dust particles 8 in the air.

The present invention pertains to a method for producing a volumetric display. The method comprises the steps of producing light from a light source. There is the step of producing a volumetric image with the light from the light source.

Figure 2:
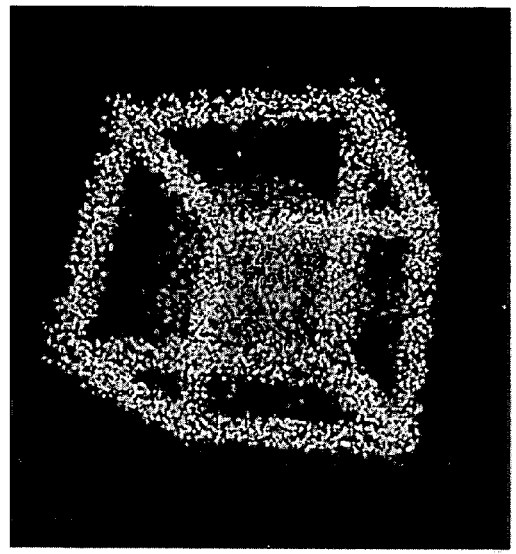
FIG. 2 is a volumetric image formed by the apparatus.

In the operation of the invention, and referring to FIG. 1, the following is a list of elements.
1. Infrared laser 1
2. Switchable visible-light laser
3. Optical component for merging the beams of the two lasers
4. Computer control for switching the visible-light laser
5. Time-varying optical beam steering mechanism 5
6. Computer control for time-varying optical beam steering
7. Linear infrared-sensitive optical position sensor 7
8. Suspended dust particles 8 in the air Two or more people perceive, in the space between them, a glowing animatable object. The object is truly volumetric, and can be seen from any point of view around the object's position, as though it is floating in thin air. Observers can freely pass their hands into the space where the object appears. The volumetric image consists of fine glowing points, which imparts to it sparkling iridescent visual quality, as shown in FIG. 2.

Figure 3:
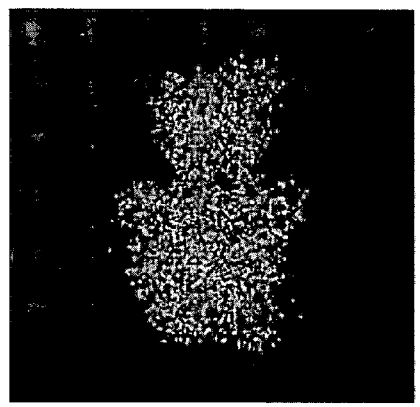
FIGS. 3, 4 and 5 are volumetric images formed by the apparatus with approximately 1070, 3400, and 10600 particles illuminated, respectively.
Figure 4:
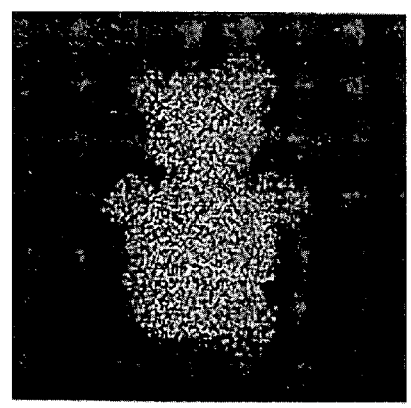
Figure 5:
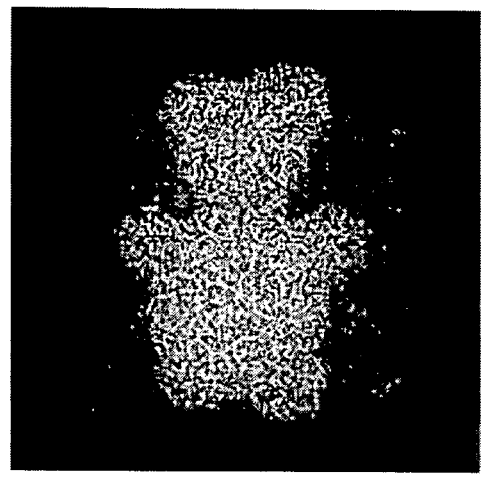

As the laser illuminates more dust particles 8 in the air, the resolution of the object improves. FIGS. 3, 4 and 5 are three examples of the same virtual "teddy bear," with approximately 1070, 3400 and 10600 particles 8 illuminated, respectively.

One of the key enabling mechanisms is that the "display volume" in which the object appears contains a concentration of moving dust particles 8. The dust particles 8 can be relatively large, on the order of 0.5–1.0 millimeter in length, so they pose no health hazard. In practice, good visual results have been achieved using lint particles 8, such as can be brushed off of loose woolen or synthetic fabrics. The cloud of particles 8 can be relatively sparse, so that the individual particles 8 are not visible to the unaided eye under normal lighting conditions.

A constant concentration of moving dust particles 8 within the display volume is maintained through an air curtain boundary. An air curtain is a device that maintains a perpendicular laminar air flow at an open entryway, thereby preventing air from escaping through that entryway, while allowing people to freely pass through unimpeded. Air curtain technology is a standard and well practiced method of containing particulate matter in a volume of air, now in widespread use in office building entrances (to maintain temperature levels as part of an air conditioning system), and in laboratory clean rooms (to prevent the passage of airborne dust or spores into or out of open laboratory entryways).

An infrared laser 1 is swept through the display volume, sweeping with enough repetitions per second so as to create the psychological effect of persistence of vision, generally at least 50 times per second. This sweeping movement is effected by a set of rotating or vibrating mirrors 5 which deflect the beam in a two dimensional scanning pattern.

Coincident along the optical path of the infrared laser 1 is a modulated visible-light laser 2. The two laser beams can be joined together by a dichroic prism 3 or functionally similar optical element 3 which reflects or transmits light depending upon the light's frequency. The two beams emerge from this optical element 3 as a single beam, with their optical axes aligned. This second laser is capable of having its brightness modulated very rapidly over time under computer 4 control.

The combined beam is directed toward a direction in which there are no observers, such as a floor or a ceiling or the open sky. An optical sensor 7 is placed at a fixed lateral distance from the scanning beam. When the beam intersects a dust particle, the dust particle will scatter some of the infrared light into the detector 7. This sensor 7 is a one-dimensional imaging device, which detects, and reports to a computer 15 (see FIG. 7), at what distance from the laser source the dust particle has intersected the light beam.

Figure 6:
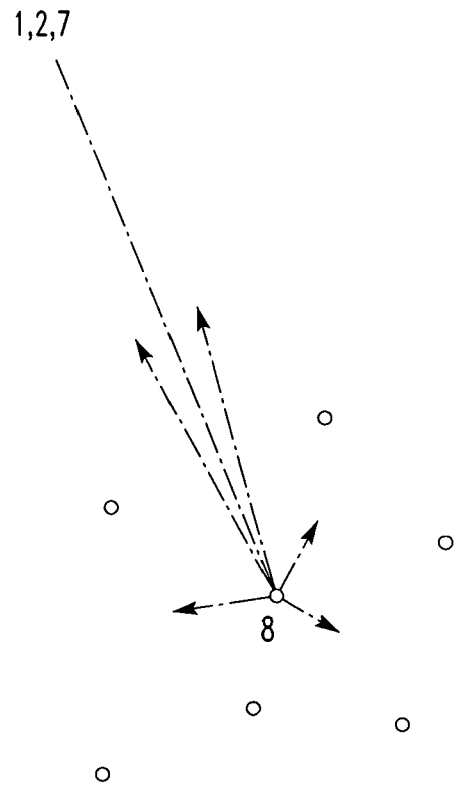
FIG. 6 shows a beam striking a dust particle.

As shown in FIG. 6, a beam from infrared laser 1 strikes a dust particle 8. Some portion of the scattered light returns to the detector 7, which measures the distance of the dust particle. This measurement triggers a brief flashing of the visible laser 2 along the same beam path, thereby visibly illuminating the dust particle. The brightness of this flash depends upon the measured distance of the dust particle.

When the sensor detects an intersection between the infrared beam and a dust particle, then the computer subsystem references a shape model which is stored in a computer memory 140, to determine what the luminance of that model should be at the corresponding point in space. The brightness of the visible beam is set accordingly for an interval of time sufficient to illuminate the dust particle with visible light, before the scanning beam sweeps away from the particle.

As the rapidly moving dust particles 8 intersect the sweeping beam at random intervals of time, and at random places along the beam, a volume of induced brightness is stochastically swept out within the air. An observer will see a glowing object floating in this volume.

By using more than one modulated visible laser 2, and by using lasers at multiple frequencies, such as a red, green and blue laser 2, the glowing object can be modulated to be any desired color at any point in the display volume.

One enabling mechanism for a distance detector 7 is now described. In this embodiment, the distance detector 7 is in-line with the laser beam itself, so that it detects only a dust particle that lies along the beam, and remains insensitive to infrared reflection off of dust particles 8 that do not lie along the beam. This can be achieved by a one-dimensional in-line detector 7, which consists of the following parts:

The infrared laser 1
A set of successive ring-shaped photo-detectors 12
A convex lens with a hole in its middle 13
The time-varying optical beam steering mechanism 14
A computer 15

As shown in FIG. 7, the beam from laser 1 travels unimpeded through a set of successive ring-shaped photo-detectors 12, and then passes unimpeded through a hole in the middle of a convex lens 13 of focal length f. The beam is then deflected by a time-varying optical beam steering mechanism 5. Returning light, which has now been scattered by a particle of dust, travels back through the optical steering mechanism 5, and is focused by the convex lens 13. After converging at a point at a distance somewhat greater than f from the lens, the light spreads out again and hits the set of ring-shaped photo-detectors 12, whose respective distances from the lens vary monotonically from 2f to f+∈e.

When the dust particle is very far away, a greater proportion of the returning light will impinge on the detectors which are closest to the lens. When the dust particle is closer to the lens, then the distance from the lens at which light reconverges will be slightly greater. This slight shift will result in a greater proportion of the light impinging on the detectors which are furthest away from the lens. The signals from the detectors are sent to a computer 15, which analyzes the pattern of luminance received by the different detectors, and converts this pattern into an estimate of the distance of the illuminated dust particle.

Alternatively, the set of ring-shaped optical detectors 12 can be arranged in a concentric circular pattern, within a single plane of constant distance from the lens 13. Compared with the cylindrical arrangement previously described, this flat geometric arrangement has the advantage of lower cost of manufacture. In this alternate arrangement, those ring-shaped detectors which have smaller radii will receive proportionally more light when the dust particle is nearer, because in that case the light from the lens 13 will not have spread out as far by the time it impinges on the plane containing the detectors. As above, the signals from the detectors are sent to a computer 15, which analyzes the pattern of luminance received by the different detectors, and converts this pattern into an estimate of the distance of the illuminated dust particle.

Figure 8:
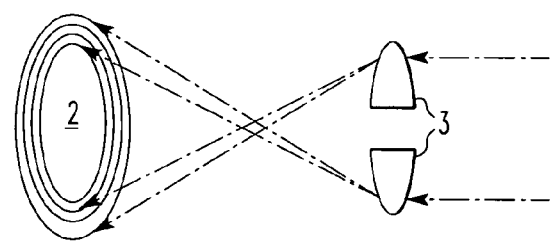
FIG. 8 is a schematic representation of reflected light from a dust particle being focused by a lens onto a detector.
Figure 9:
FIGS. 9 and 10 show an animated figure imaged directly in the air in popular films.
Figure 10:

As shown in FIG. 8, light from the dust particle is focused by lens 13 upon different rings of the concentric-ring structured detector 12. Light from a very distant dust particle will impinge on the outer ring of the detector, whereas light from a nearer dust particle will focus slightly further away from the lens, and will therefore impinge more on the inner rings of the detector.

In regard to multiple laser sources, for a given density of dust particles 8 in the air, the effective resolution and brightness of the device can be increased through the use of multiple projection units, each of which is switched independently. These multiple beams simultaneously illuminate the same dust population in the volumetric space. For a given number of moving dust particles 8, the use of N projection units multiplies both brightness and spatial resolution by a factor of N.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for producing a volumetric display comprising:
a scanning collimated light source that creates an image by illuminating a suspension of light-scattering particles in an optically transparent medium with a collimated beam, where the brightness of the collimated beam is modulated at each moment in time by an amount that is dependent upon the momentary direction of the beam and also on the distance of the scattering particle from the light source encountered by the beam at that moment, the beam includes a first, monitoring, collimating beam used to detect the presence of the particle, and a second, illuminating, beam is used to illuminate the detected particle.

2. An apparatus as described in claim 1 wherein the collimated light source is a laser.

3. An apparatus as described in claim 2 wherein the optically transparent medium is air.

4. An apparatus as described in claim 3 wherein the light-scattering particles are suspended dust.

5. An apparatus as described in claim 4 wherein the light source includes rotating mirrors or resonantly vibrating mirrors, which effect the scanning or some combination of rotating mirrors or vibrating mirrors.

6. An apparatus as described in claim 5 wherein the scanning by the light source is two-dimensional, thereby sweeping out a volumetric display region.

7. An apparatus as described in claim 6 wherein the monitoring beam is outside of the visible spectrum.

8. An apparatus as described in claim 7 wherein the spectrum is an infrared portion of the electromagnetic spectrum.

9. An apparatus as described in claim 8 wherein the illuminating beam may vary in color.

10. An apparatus as described in claim 9 wherein the light source includes a red, green and blue laser that produce three independently modulated contributions for color.

11. An apparatus as described in claim 10 wherein the contributions from the red, green and blue laser are combined into a single beam path.

12. An apparatus as described in claim 11 including a dichroic beam combiner, which combine the contributions.

13. An apparatus as described in claim 12 including a computer memory in which a three dimensional volumetric model of illuminance is stored, and in which the direction of the beam and the distance of the particle along the beam are used to index into this volumetric model to determine a brightness setting for the illuminating beam.

14. An apparatus as described in claim 13 including an optical detector is used to measure the light from the monitoring beam which a particle has scattered.

15. An apparatus as described in claim 14 wherein the optical detector measures the distance of the detected particle along the monitoring beam.

16. An apparatus as described in claim 15 wherein the optical detector is collinear with the optical beam, so that returning light which is scattered directly back along the beam path is visible to the detector.

17. An apparatus as described in claim 16 wherein the returning light is focused by a focusing means wherein the focusing means includes a convex lens, and measurement of the distance between the focusing device and the point of focus of the returning light is used to determine the distance along the beam of the detected particle.

18. An apparatus as described in claim 17 wherein the light source produces scanning beams that are used to simultaneously illuminate two or more suspended particles within the same volume.

19. An apparatus for producing a volumetric display comprising:
   a light source for providing light, the light source includes an infrared switchable visible-light laser; and
   means for producing a volumetric image with the light from the light source.

20. An apparatus as described in claim 19 wherein the producing means includes an optical component for merging the beams of the two lasers.

21. An apparatus as described in claim 20 wherein the producing means includes computer control for switching the visible-light laser.

22. An apparatus as described in claim 21 wherein the producing means includes a time-varying optical beam steering mechanism.

23. An apparatus as described in claim 22 wherein the producing means includes computer control for time-varying optical beam steering.

24. An apparatus as described in claim 23 wherein the producing means includes linear infrared-sensitive optical position sensor.

25. An apparatus as described in claim 24 wherein the producing means includes suspended dust particles in the air.

26. A method for producing a volumetric display comprising the steps of:
   producing light from a light source; and
   producing a volumetric image with the light from the light source illuminating dust particles in an optically transparent medium.

27. A method as described in claim 26 wherein the producing light step includes the step of modulating at each moment in time brightness of a collimated light beam that is dependent upon the momentary direction of the beam and also on the distance of the dust particles from the light source encountered by the beam at that moment.

28. An apparatus for producing a volumetric display comprising:
   a scanning collimated light source that creates an image by illuminating a suspension of dust particles in an optically transparent medium with a collimated beam, where the brightness of the collimated beam is modulated at each moment in time by an amount that is dependent upon the momentary direction of the beam and also on the distance of the scattering particle from the light source encountered by the beam at that moment.

29. An apparatus as described in claim 28 wherein the beam includes a first, monitoring, collimating beam used to detect the presence of the particle, and a second, illuminating, beam is used to illuminate the detected particle.

30. A method for producing a volumetric display comprising the steps of:
   producing a light beam from a light source wherein the beam includes a first, monitoring, collimating beam used to detect the presence of the particle, and a second, illuminating, beam is used to illuminate the detected particle; and
   producing a volumetric image with the light beam from the light source.

* * * * *